Patented Nov. 6, 1951

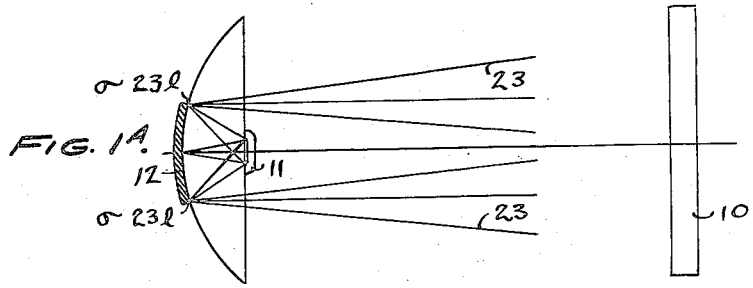
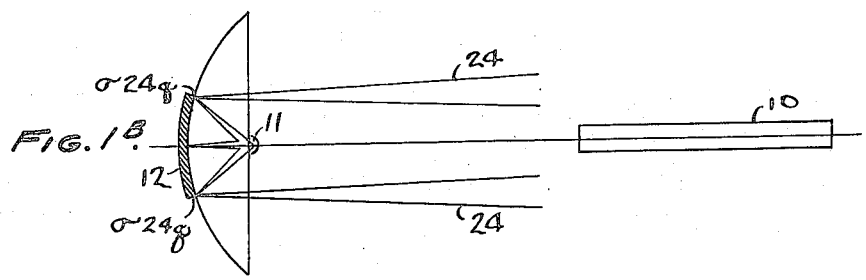
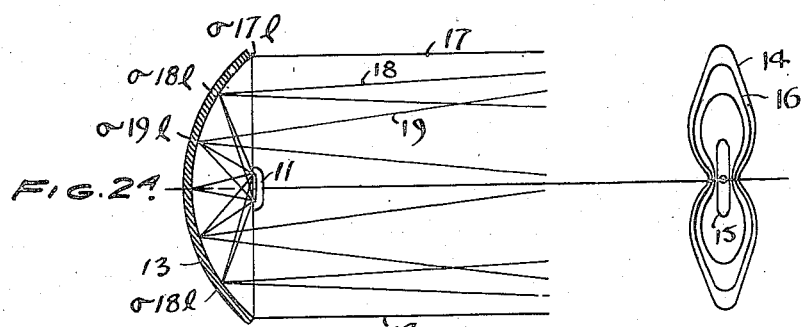
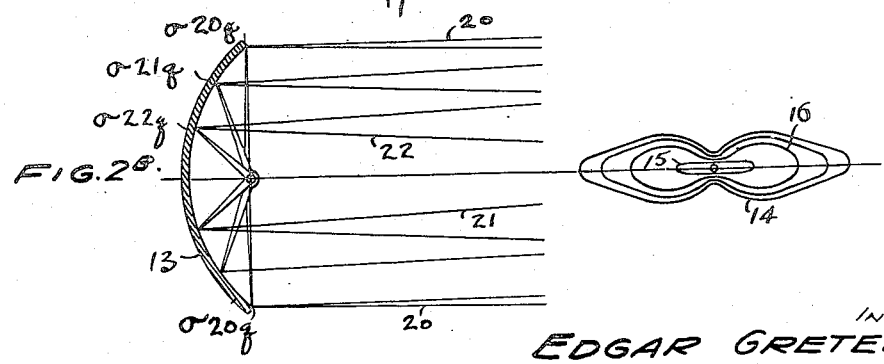

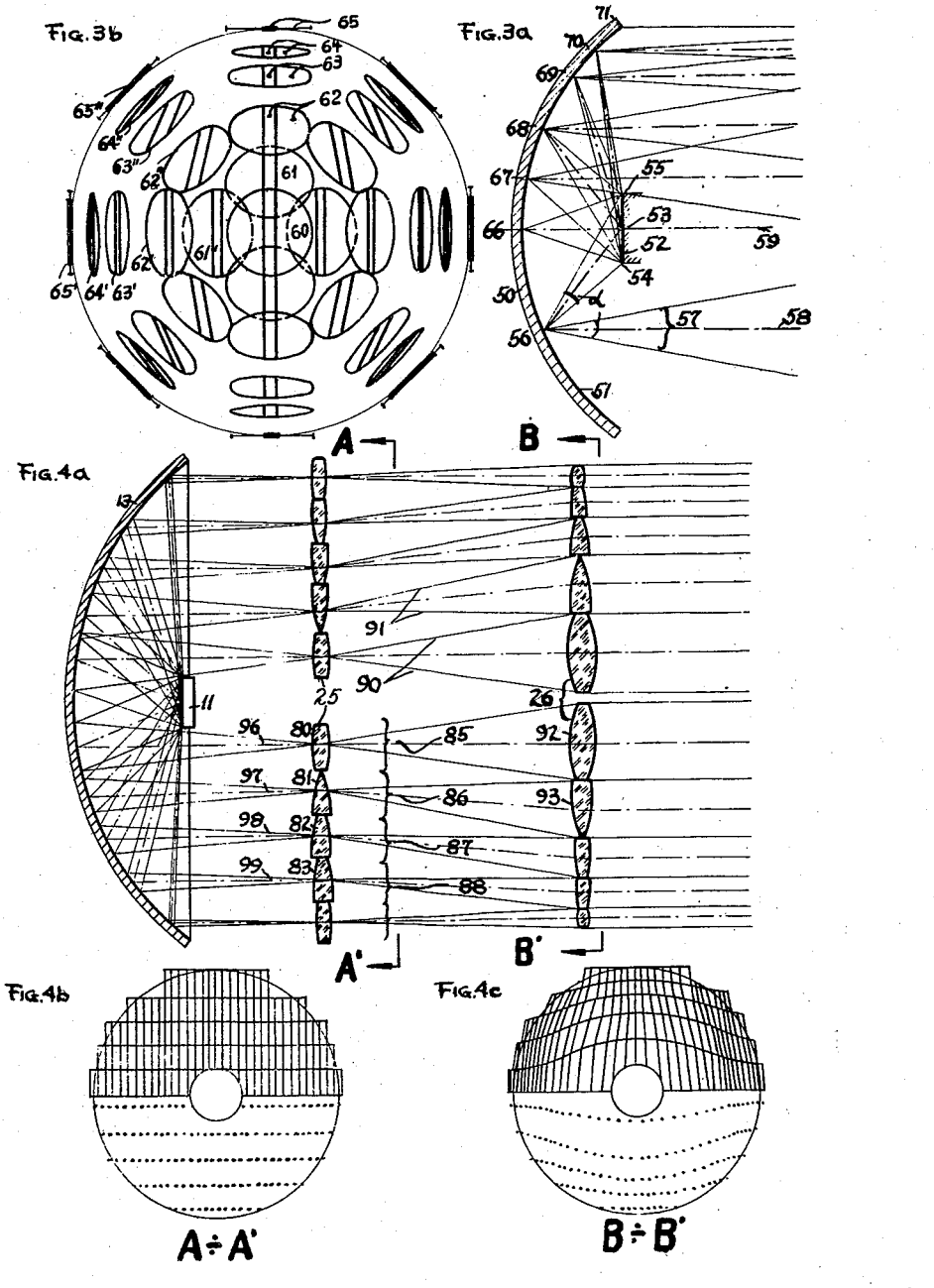

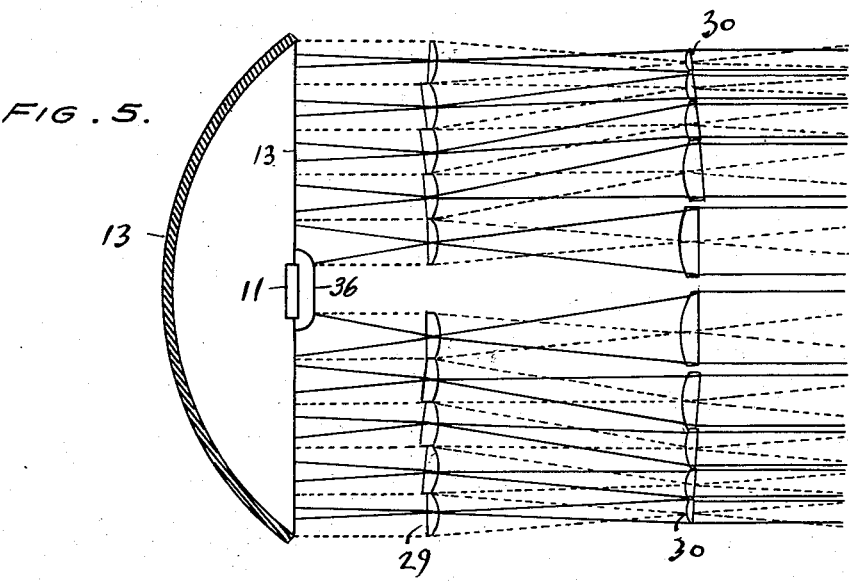
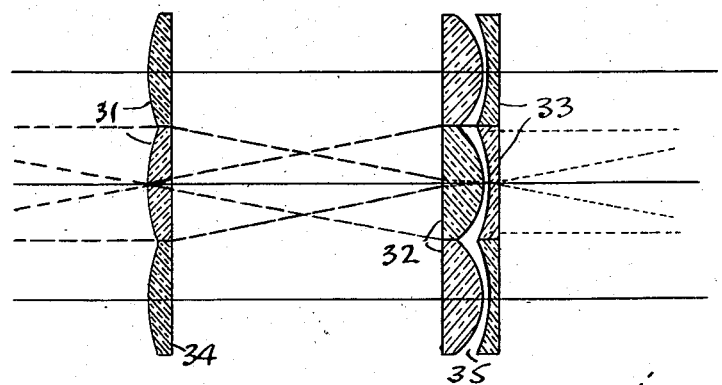
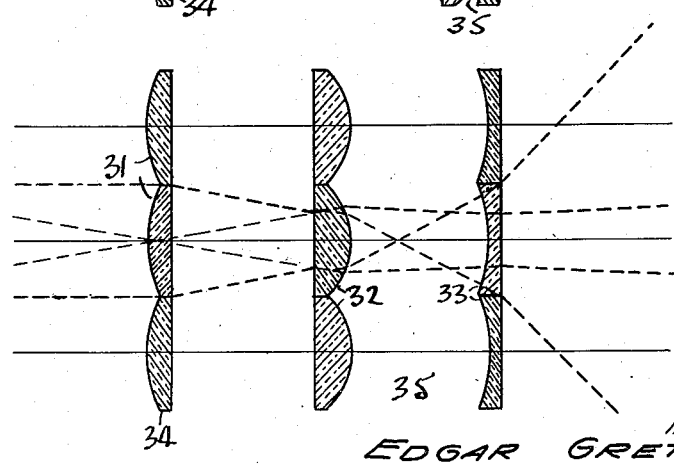

2,574,031

UNITED STATES PATENT OFFICE 2,574,031

ILLUMINATION SYSTEM

Edgar Gretener, Zurich, Switzerland

Application December 31, 1947, Serial No. 795,156
In Switzerland April 5, 1946

10 Claims. (Cl. 240—41.3)

The present invention concerns an illuminating system.

It is an object of the invention to provide means for illuminating a surface with a predetermined distribution of light.

It is an object of the invention to provide means to correct for distortion of light beam cross section resulting from widely differing aperture angles of the elementary light beams making up a main beam.

It is an object of the invention to provide means to correct for the variable twisting of the elementary light cones emanating from individual points on a reflector.

It is an object of the invention to provide an illuminating system which produces a sharply defined net angular searchlight beam for parabolic reflectors having apertural angles in the region of 180 degrees, the beam possessing a homogeneous luminous intensity over its entire cross sectional area.

Referring to the drawings, like numbers indicate like parts throughout.

Fig. 1a is a schematic representation in section of a light source and beam with the principal beam axis in a vertical position.

Fig. 1b is a schematic representation in section of a light source and beam with the principal beam axis horizontal.

Fig. 2a is a schematic representation in section of a light source and a different resultant beam, having its principal axis vertical.

Fig. 2b is a schematic representation in section of a light source and the second resultant beam with its principal axis horizontal.

Fig. 3a is a schematic sectional view of a rectangular light source and a reflector showing the variation in character of elementary light beams as their angle changes with respect to the optical axis of the system.

Fig. 3b is a representation of the distortion experienced by elemental light beams from a rectangular source when reflected by a large angle reflector.

Fig. 4a is a schematic representation in section of an illumination system in accordance with the invention.

Fig. 4b is a sectional view taken along line A—A' of Fig. 4a.

Fig. 4c is a sectional view taken along line B—B' of Fig. 4a.

Fig. 5 is a schematic representation in section of another illumination system in accordance with the invention.

Fig. 6 is a sectional view of a second form of a portion of the structure shown in Fig. 5.

Fig. 7 is a sectional view of a different arrangement of the lens elements of Fig. 6.

In the illuminating art there often arises the problem of illuminating a surface by means of a single light source so as to produce a predetermined or desired distribution of luminous intensity. The light level as measured in foot candles incident upon the object may be equal in all parts or have any pre-assigned value. For example, where a grid system is employed the surface to be illuminated may be divided into a plurality of elemental areas which may for convenience be thought of as small elemental areas each of which receives illumination from its respective lens element. In accordance with a light level desired one elemental lens may illuminate a number of elemental areas or a number of elemental lenses may illuminate a single unit area where there is a variation in light level over the surface being illuminated. The foot-candle level directed upon each elemental area may have any assigned value from zero to the maximum intensity of which the source is capable under the conditions of operation and the level in each elemental area may differ from the level in any other elemental area if desired. If the surface to be illuminated is of infinite extent, the problem becomes one involving the luminous cone of, for example, a searchlight with a predetermined distribution of light over the cross sectional area of the light cone.

Although the present invention concerns an illumination system in the general sense an important element of the system is the use of a searchlight employing a cylindrical carbon arc source. While such a source is actually three-dimensional it may be treated for analysis purposes as a rectangle lying in the plane of the focus of the searchlight reflector normal to the optical axis of the system. When such a rectangular source is used with a reflector of large apertural angle, as for example one approaching pi radians, correction is required of the effects produced by the widely differing aperture angles of the elementary light beams and of the variable twisting thereof in order to achieve accurate positioning of the images of the light source on a screen in abutting relation without overlapping. Overlapping of the source images produces heterogeneous illumination, reduces the lighting efficiency of the system, and causes partial illumination of second screen lenses and increases the overall dimensions of the optical system.

As will be explained in detail below the use of a large angle reflector introduces two factors which must be allowed for. One is the variation in projected area of the source on the reflector as one departs from the optical axis of the system and the other is the actual twisting of the projected images of the source as one departs from the optical axis.

It is a principal object of the invention to provide means to correct for the above two factors and to obtain the desired effect of homogeneous luminous intensity of the beam or other desired distribution of light.

In the case just mentioned the underlying relationships are more clearly evident than in more restricted examples. The cross sectional area of a searchlight cone such as that shown in Figs. 1a and 1b may be taken to be a rectangle 10 having a length considerably greater than the width and a light distribution of substantially uniform intensity over the entire area of the rectangle 10. The surface to be illuminated by the rectangle 10 is taken to be infinitely remote.

The light source 11 is taken to be the shape of a luminous cylinder disposed crosswise of the optical axis in the focal plane of a parabolic reflector 12. The ratio of the length of cylinder 11 to its diameter is taken to be such that it corresponds approximately to that required to produce the desired light beam section.

When reflector 12 has a very small apertural angle, the desired homogeneous beam is obtained directly and the shape thereof corresponds to the shape of the luminous cylinder. Such a searchlight, however, utilizes but a small portion of the total radiation supplied by the luminous cylinder and is very inefficient. To increase the efficiency it is necessary to increase the apertural opening of reflector 12.

The apertural opening may be increased to the limiting case of a parabolic reflector 13, having an apertural angle of 180 degrees. At this angle both the rectangular shape 10 of the searchlight cone and the homogeneous distribution of the luminous intensity therein are lost as shown in Fig. 2.

Polar diagram 14 shows the image 15 of light cylinder 11 as a brightest area and the iso-lumen lines 16 outlining descending levels of illumination. The resulting distortion of the beam cross section of diagram 14 and the widely variable or non-homogeneous distribution of light shown by iso-lumen lines 16 are attributable to two causes.

First, the luminous cylinder 11, when a reflector with a large apertural opening such as reflector 13 is used, appears to emanate from the various points of the reflector 13 at solid angles of different sizes, so that the telecentric elementary beams 17, 18 and 19 produced by reflector 13 have widely differing apertural angles as sigma 17$l$, sigma 18$l$ and sigma 19$l$ in Fig. 2a. The same is true of sigma 20$q$, sigma 21$q$ and sigma 22$q$ of Fig. 2b. Sigma $l$ indicates an apertural angle of the elementary light tubes viewed lengthwise as Figs. 1a and 2a. Sigma $q$ indicates an apertural angle of the elementary light tubes viewed crosswise as in Figs. 1b and 2b. As previously discussed, the substantially isogonal beams of Figs. 1a and 1b with apertural angles sigma 23$l$ and sigma 24$q$ yield homogeneous illumination as shown by the absence of iso-lumen lines on rectangle 10. The shift in value of the apertural angle sigma is small for a reflector such as 12.

Second, in a parabolic reflector 13 of large aperture, the reflecting operation produces a variable twisting of the elementary luminous cones, 17, 18 and 19 viewed in elevation and 20, 21 and 22 viewed in plan, emanating from the individual points or apertural angle vertices sigma 18$l$, etc. on the reflector 13 and travelling towards the luminous cylinder. This twisting of the elementary beams 17 through 22 inclusive is illustrated in Fig. 3a for a parabolic reflector 13 having an opening of 180 degrees and a luminous cylinder whose length is 1/15 of the diameter of the reflector 13 and whose diameter is 1/5 of its length.

The twisting of the images of a rectangular source are shown to excellent advantage in Figs. 3a and 3b.

Fig. 3a schematically shows a cross-section through a parabolic reflector 50 with a light collecting angle of 90°. 51 is the reflecting surface of said reflector, 52 the light emitting surface of a light source the centre 53 of which is located in the focal point of the reflector. Light rays emanating from point 54 and 55 on the circumference of said source and lying in the plane of the paper fall upon a point, e. g. 56, of the reflecting surface 51. They form a light cone 57 the aperture angle $a$ of which is equal to the angle with which the line connecting points 54 and 55 is seen from point 56. The central ray 58 of said cone emanating from the centre 53 of the light source is deflected to be parallel to the optical axis 59 of the reflector.

If the light emitting surface of the light source is of circular shape the cross section of said light cone will be elliptical. The varying shape and size of the ellipses depend upon the positioning of the reflecting point on the surface of the reflector and are schematically indicated in Fig. 3b. If said reflecting point lies in the centre of the reflector the cross-section of the cone is circular. If the reflecting point moves along a meridian of the reflector surface towards its circumference the ellipses flatten more and more due to the decreasing angle $a$ until they will degenerate into a line at the circumference, as the light collecting angle of the reflector is 90° and the reflecting point will then lie in the plane of the light emitting surface of the source. The cross-sections 60 to 65 of the light cones are reflected by points 66 to 71 respectively, on the reflector. As the light source is of circular shape this is valid for any direction of the meridian on the reflector and the appertaining ellipses then will be for example, 60' to 65' or 60'' to 65''.

If the light emitting surface is not circular but rectangular the shape of the cross-section of such cones will also be rectangular as shown in Fig. 3b. But now either the breadth or width of such rectangles or even both will decrease as the reflecting point moves along a meridian towards the circumference of the reflector. If said meridian is parallel to either side of the rectangle of the light source the resulting rectangular sections of the light cone will be parallel to the rectangle of the source. But for all other meridians they will be additionally twisted against the position of the light source. The superposition of such light cones in the resulting main beam of the reflector will produce the butterfly-like distribution of diagram 14 of Figs. 2a and 2b.

As mentioned above, such reflector systems are, therefore, either inefficient or result in a heterogeneous distribution of light over the cross-sectional area of the searchlight beam and consequently upon the object under illumination.

One form of the illuminating system according to this invention is shown in Fig. 4a and comprises two lenticular plates 25 and 26, which in the case of a searchlight, are disposed in the telecentric light beam, emanating from the parabolic reflector 13 with a large light collecting angle. The lenses of the lenticular plate 25 split the whole beam into separate elementary light cones. Such cones are of cross-sectional areas which vary within wide limits and are according to their positions, twisted to a greater or less extent. By appropriately shaping and arranging the lenses on the second lenticular plate 26 such cones are converted into elementary beam producing illumination areas on the object to be illuminated which are of equal size and exactly superposed.

This is effected by the lenticular system in the following manner:

Fig. 4a shows a meridional section through an illumination system according to the present invention having the light source 11 of rectangular shape with its long side parallel to the plane of the paper. The centre of the light emitting surface is located at the focal point of the parabolic reflector 13. A first lenticular plate 25 consisting of lenses of identical shape and size is inserted into the path of the light beam from the reflector 13. The shape of the lenses of the plate 25 corresponds to the form of the area to be illuminated on said object and the light emitting surface of the light source is likewise given a similar rectangular form. The lenses of plate 25 are distributed on said plate in a regular point pattern, as shown in Fig. 4b, which represents a view of the plate as seen from line A—A'. The total light beam issuing from the reflector 13 is split up by the lenses of the first plate 25, e. g. lenses 80 to 83 into separate elementary beams 85, 86, 87 and 88. The lenses of plate 25 are given such a focal length that, by means of such beams, they form images of the light source 11 in the plane of the second plate 26 farther away from the reflector. This is indicated by thin lines, e. g. 90 and 91. Analogously to the effect explained with reference to Fig. 3 the different elementary beams separated by the lenses of plate 25 possess varying sectional areas and the size of the images produced on plate 26 varies accordingly.

In order to utilize all light emanating from the reflector the arrangement of the lenses on plate 26 must permit all light contained in the appertaining beam to be directed on to the area to be illuminated. Thus, for example, a beam 85 must fully illuminate lens 92, a beam 86 lens 93 and so forth. If the beams overlap in the plane of the plate 26 only part of the light can be directed on to the object and utilized for its illumination. If, on the contrary, the elementary cones do not adjoin in the plane of the second plate, the lenses of said plate are not fully illuminated.

To obtain a full utilization of all light the elementary cones must adjoin without interstices on plate 26 and the shape, size and position of the lenses on that plate must correspond to the varying sectional area and to the twisting of the different elementary cones. This implies that the central rays of the cones, e. g. 96, 97, 98, 99, which are parallel before falling upon plate 25 must be deflected by the lenses thereof in such a way that every beam fully illuminates only the appertaining lens on plate 26. After traversing plate 26 said central rays are again made parallel to the optical axis or they are made convergent so as to be directed to the centre of the area to be illuminated. This is obtained, as shown in Fig. 4a employing lenses 25 producing said inclination and lenses on plate 26 making good for said inclination in the inverse sense both by an appropriate angle. The illumination fields on the area to be illuminated are thereby exactly superposed as by the varying inclination the central rays of all elementary beams are directed on to the centre of said area or are again made parallel in case of a searchlight with a telecentric light beam.

The lenses on plate 25 are of equal size and consequently the beams projected by the lenses of the second plate on to the object possess identical angles of aperture, as e. g. indicated by rays 100 and 101 in Fig. 4a. The illumination fields produced on the object by the different elementary beams are therefore also of identical size.

In contrast to the regular point pattern in which the lenses of plate 25 are arranged, as shown by Fig. 4b, the form and the point pattern in which the lenses of plate 26 are arranged is adapted to the varying size and to the twisting of the sectional areas of the separate elementary beams. This is shown in Fig. 4c, being a view of the plate or seen from B—B'.

In order to obtain the necessary deflection of the central rays of the elementary beams, "eccentric" lens elements may be employed as shown in Fig. 4a. Such lens elements are called "eccentric" because they are obtained by cutting parts out of regular spherical lenses eccentrically to the optical axis of said lens. Consequently the optical axis of such eccentric lens elements does not coincide with the centre of its geometrical form.

As mentioned above, basically, by this system, any arbitrarily predetermined distribution of light can be secured over the cross sectional area of the searchlight cone and upon the object to be illuminated. The new illuminating system comprises two lenticular or lens grid plates 25 and 26, which, in the case of a searchlight, are disposed in the telecentric path of the elementary beams, such as 17 through 22 inclusive, in front of large aperture parabolic reflector 13. Lens grid plates 25 and 26 serve to decompose the whole stream of light issuing from parabolic reflector 13 into individual elementary tubes of light each of whose aperture can be adapted to the problem in hand by suitably shaping the individual lens elements. In the case of the searchlight under discussion, the telecentric elementary beams leaving the reflector 13 possess apertures and cross section surface positions that are variable within wide limits. However these can be converted into a group of congruent telecentric elementary beams.

If all the lens elements 80, 81, 82, 83, etc. of lens grid plate 25 are of the same geometric shape, a searchlight cone will be produced having homogeneous light intensity distribution throughout the cone cross section.

If the focal plane images of the light source 11 produced by the first lens grid plate 25 do not overlap each other, the shape and size of the individual lens elements 92, 93, etc. of the second lens grid plate 26 can be made to coincide with these light source images. As a result lens elements 28 treat the lens elements 80, 81, 82, 83, etc. as a new light source and reproduce it as an image at infinity of a character determined by the individual characteristics of each separate lens element 27.

If the focal plane images of light source 11 as produced by lens elements 27 of lens grid plate 25 do overlap or if overlappings occur, the elementary tubes of light between lens grid plates 25 and 26 must be so deflected that the elementary light source images no longer cover each other. This effect is obtained by the use of combined prismatic lenses 29 and 30. Eccentric lens elements can also be used for effecting the desired deflection.

The size of the illuminated surface may be rendered variable by dividing the second lens grid plate 26 into two partial systems comprising positive lens elements and negative elements such as plano-convex lens elements 32 and plano-concave elements 33. The resulting refractive power of the combination of the two positive and negative lens elements is so adjusted that the image of the elementary lenses 31 used in the first lens grid plate 34 is formed at infinity by the lens combination 32, 33 of the second lens grid plate 35.

In order to increase the illumination level of the object surface, the partial systems 32, 33 of lens grid plate 35 are moved toward each other. This method is satisfactorily possible only when a telecentric beam is used between the lenticular plates 34 and 35. The term "telecentric beam" refers to such beams or elementary beams the source of which lies at an infinitely remote distance or the virtual image of the source appears to lie at an indefinitely remote distance, so that all light rays, or at least all central rays coming from the center of the light source are parallel. This in a general sense is the case with a beam projected by a parabolic reflector. The rays of such a beam are often treated as parallel, but we have seen above that this is not sufficiently accurate.

The use of negative lenses 33 as elements of lens grid plate 35 is especially advantageous in achieving maximum increase in the size of the illuminated surface. When plano-convex lenses 32 of second lens grid plate 35 are moved toward first lens grid plate 34 a very extensive increase in the area of illuminated surface is obtained without destroying the homogeneity of the luminous intensity. Fig. 7 represents the path of the beam in such a case.

Screen 36 may be employed to stop the direct radiation from source 11 if desired. Also the screen 36 may take the form of a supplementary reflector as disclosed in my copending application Serial No. 760,920, filed July 14, 1947, now Patent 2,555,057, issued May 29, 1951.

I claim:

1. An illuminating system, a reflector subtending a large solid angle, a light source at a focus of said reflector, a first lenticular plate in the path of light reflected by said reflector having a plurality of lens elements thereon arranged to form a plurality of elementary images of said source, a second lenticular plate in the path of light transmitted by said first plate, said second lenticular plate having a plurality of individual lens elements differently shaped and positioned differently about the optical axis of the system whereby they correct distortion of the elementary light beams producing said images of said source.

2. The combination set forth in claim 1, the boundary lines of said individual lens elements of said second lenticular plate being oriented along curves converging toward points on opposite edges of said second plate.

3. In an illumination system, a concave reflector of large light collection angle, a light source of decidedly oblong shape, said source being positioned adjacent to the focus of said reflector, a first lenticular plate in the path of the light reflected by said reflector, a second lenticular plate, said first lenticular plate having individual lenses of equal size and shape arranged in a regular pattern and forming images of said oblong light source in the plane of said second lenticular plate, said first lenticular plate being positioned intermediate to said reflector and said second lenticular plate, said second plate having individual lenses of varying configuration dimensioned and positioned appropriately to the dimensions and position of the images of the light source formed by the individual lenses of said first plate and projecting images of the conjugate lenses of the first plate upon the area to be illuminated, whereby a desired homogeneous illumination on said object is obtained.

4. An illumination system as claimed in claim 3, said individual lenses of said first plate being so shaped and positioned that the images of said light source formed by said first plate do not overlap one another.

5. An illumination system as claimed in claim 3, said individual lenses of said second plate being arranged along curved lines symmetrical about a common center.

6. An illumination system as claimed in claim 5, said individual lenses of said second plate being prismatic lenses.

7. The combination set forth in claim 3, the lens elements of said first plate being so shaped that they deflect said elementary beams by varying amounts so that said elementary images formed thereby do not overlap each other in said focal plane and the lens elements of said second plate being so shaped that they each deflect the appertaining light beam by equal amounts, but in the opposite direction.

8. The combination set forth in claim 3, the lenses of said first and said second plate being combined prismatic lenses whereby deflection of the elementary beams is effected.

9. In an illumination system, a concave reflector of large light collection angle, a light source of decidedly oblong shape, said source being positioned adjacent the focus of said reflector, a first lens grid plate in the path of light reflected by said reflector, a second lens grid plate, said first lens grid plate having individual lenses of related size and shape arranged in a selected pattern and forming images of said oblong light source in the plane of said second lens grid plate, said first lens grid plate being positioned intermediate said reflector and said second lens grid plate, said second lens grid plate having individual lenses dimensioned and positioned appropriately to the dimensions and position of the images of the light source formed by the individual lenses of said first plate and projecting images of the corresponding lenses of the first plate upon the area to be illuminated, whereby a desired homogeneous illumination on said object is obtained.

10. The combination set forth in claim 9, said individual lenses of said second plate comprising lens elements having individual optical axes eccentric to the main optical axis of the system, said lens elements being oriented along curved lines symmetrical about the said main optical axis.

EDGAR GRETENER.

REFERENCES CITED

The following references are of record in the file of this patent:

UNITED STATES PATENTS

| Number | Name | Date |
|---|---|---|
| 635,473 | Goerz et al. | Oct. 24, 1899 |
| 1,313,857 | Dennington | Aug. 19, 1919 |
| 1,581,491 | Rhodes | Apr. 20, 1926 |
| 1,686,525 | House | Oct. 9, 1928 |
| 1,853,533 | Arbuckle | Apr. 12, 1932 |
| 2,183,249 | Schering et al. | Dec. 12, 1939 |
| 2,186,123 | Rantsch et al. | Jan. 9, 1940 |

FOREIGN PATENTS

| Number | Country | Date |
|---|---|---|
| 319,790 | Germany | Mar. 31, 1920 |